United States Patent
Beeston et al.

(10) Patent No.: US 7,020,742 B2
(45) Date of Patent: *Mar. 28, 2006

(54) SYSTEM FOR FAST TAPE FILE POSITIONING

(75) Inventors: Ralph Thomas Beeston, Tucson, AZ (US); Kirby Grant Dahman, Tucson, AZ (US); Kathryn Eileen Eldred, Tucson, AZ (US); Christopher Paul Grunow, Tucson, AZ (US); Joel Kenneth Lyman, Tucson, AZ (US); Jon Arthur Lynds, San Jose, CA (US); Wayne Erwin Rhoten, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 11/013,011

(22) Filed: Dec. 14, 2004

(65) Prior Publication Data

US 2005/0102330 A1 May 12, 2005

Related U.S. Application Data

(63) Continuation of application No. 09/968,589, filed on Oct. 1, 2001, now Pat. No. 6,832,287.

(51) Int. Cl.
*G06F 12/00* (2006.01)

(52) U.S. Cl. ............................................. 711/111; 707/5

(58) Field of Classification Search ................ 711/111, 711/112, 170, 203; 707/5
See application file for complete search history.

(56) References Cited

U.S. PATENT DOCUMENTS

| 4,685,152 | A | * | 8/1987 | Heare ................................. 2/4 |
| 5,897,661 | A | * | 4/1999 | Baranovsky et al. ........ 711/170 |
| 5,996,055 | A | * | 11/1999 | Woodman .................... 711/203 |
| 2003/0014585 | A1 | * | 1/2003 | Ji ................................ 711/112 |

* cited by examiner

*Primary Examiner*—Hiep T. Nguyen
(74) *Attorney, Agent, or Firm*—Dale F. Regelman

(57) ABSTRACT

The present invention provides fast read performance for accessing a file from a multiplicity of files when its corresponding Block ID is unavailable, by furnishing new file-positioning commands, allowing access to data based on File Number, at the same fast locate speed as with Block Ids, thereby expanding the range of applications that can use certain tape drive systems effectively. The present invention includes both a device architecture for supporting the file oriented positioning and the appending, as well as a software system that can permit easy application access to the device facilities and system components which permit the advantages to accrue without any software application or operator changes, including a robust architecture for navigating residual data, e.g., for data recovery. The present invention comprises several device command innovations, a relative positioning command, an absolute positioning command, and other commands, e.g., for sensing current position.

9 Claims, 12 Drawing Sheets

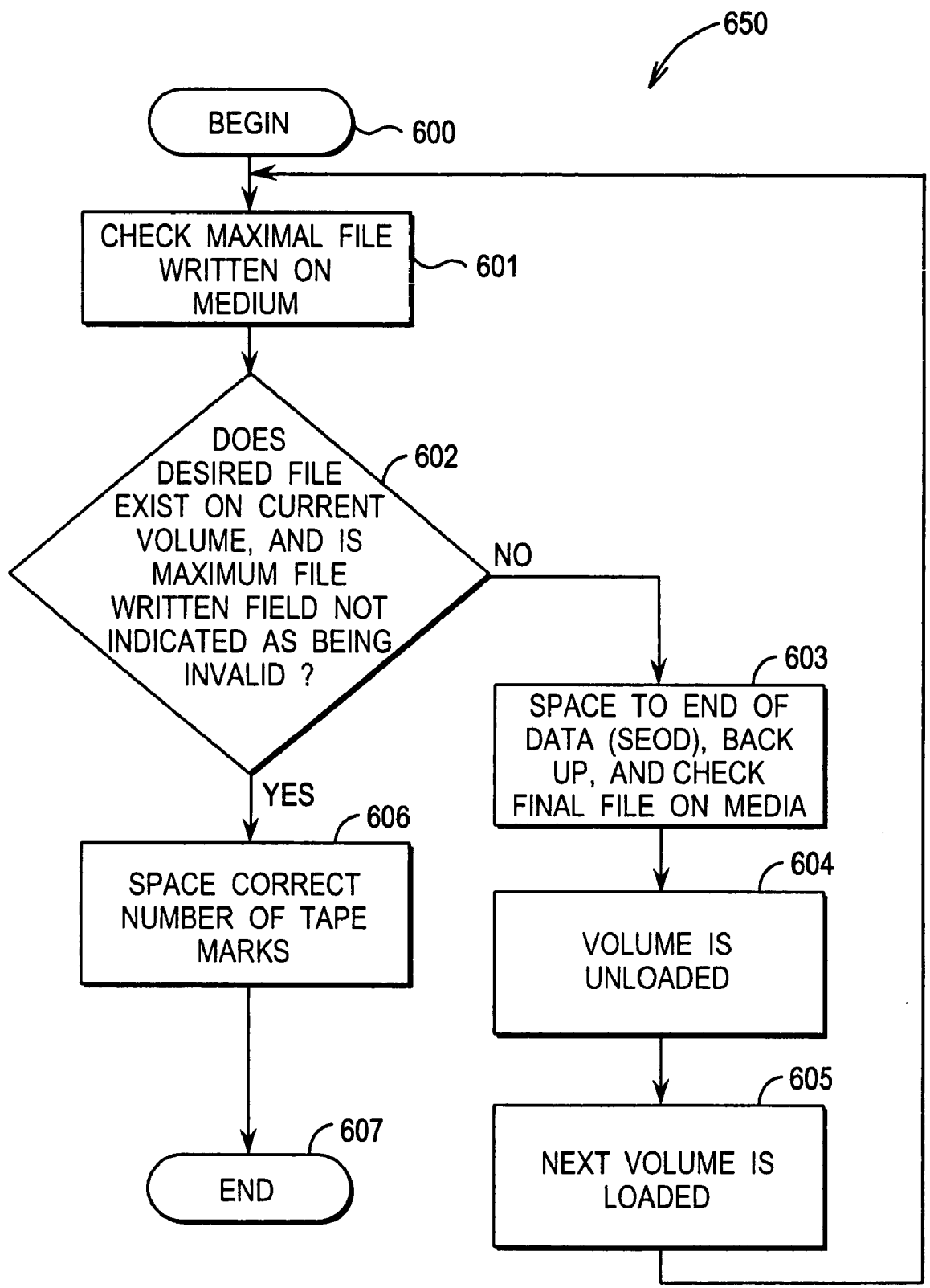

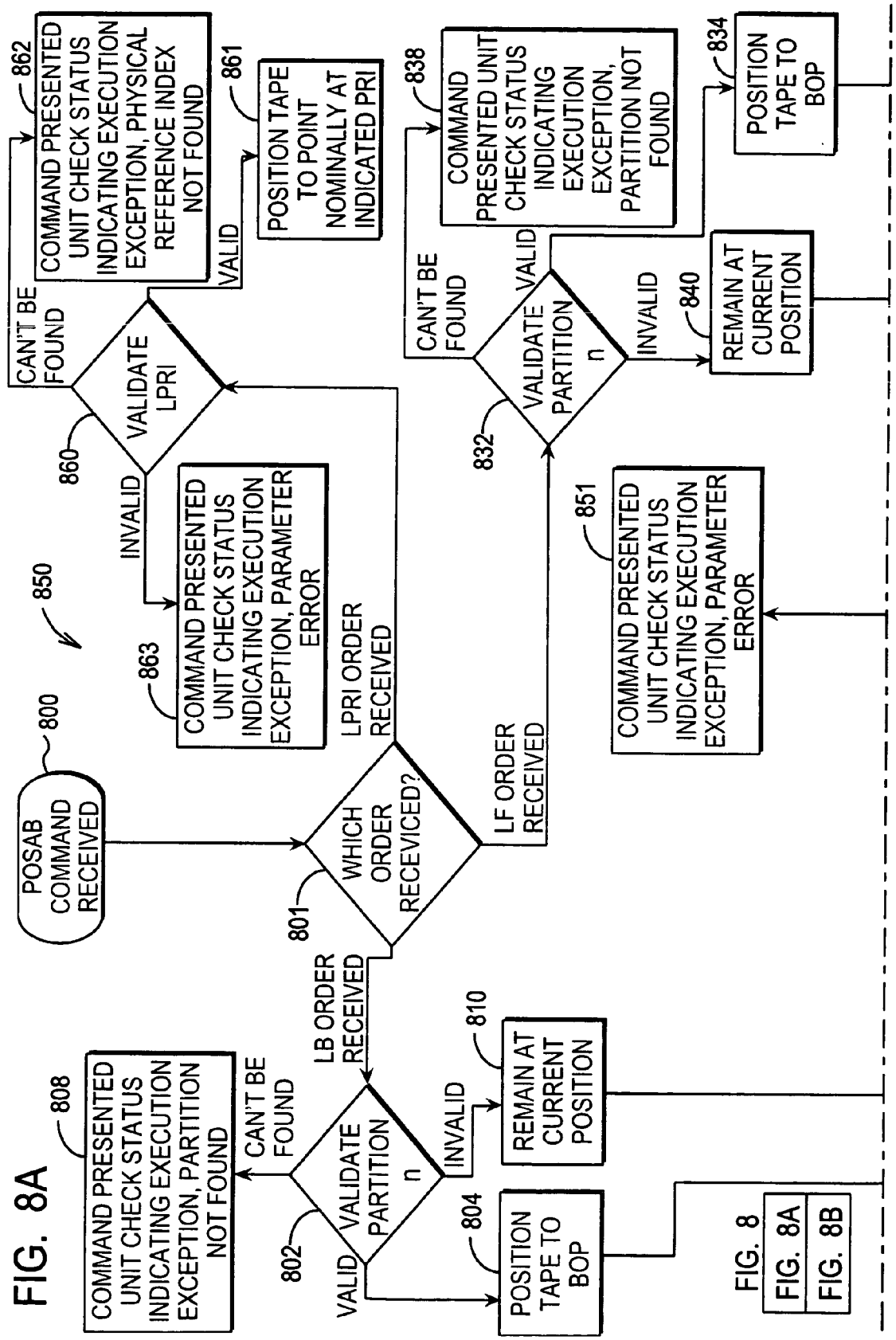

SYSTEM FOR FAST TAPE FILE POSITIONING

CROSS-REFERENCE TO RELATED APPLICATIONS

This is a Continuation application of Ser. No. 09/968,589 filed Oct. 1, 2001 now U.S. Pat. No. 6,832,287.

FIELD OF THE INVENTION

Applicants' invention relates, generally, to a data storage management system and method to permit a computer system to read and write data in alternative information storage architectures using a data storage device having a fixed device architecture. Applicants' invention relates, more specifically, to a data storage management system and method to permit fast file-oriented positioning and appending.

BACKGROUND OF THE INVENTION

An explosion of computer data and information requires an ever-increasing amount of computer readable storage space. Faster access to such storage space, particularly in light of ever-increasing data storage capacity, requires improved file positioning systems. In particular, such high-speed file positioning may be indicated in systems having components to backup and protect data sets, and to migrate less active data sets to secondary storage to increase primary storage space. A data set consists of any collection or grouping of data. In certain systems, a data set may include control information used by the system to manage the data. The terms data set and file are generally equivalent and sometimes are used interchangeably. Hierarchical storage management (HSM) programs manage storage devices, such as tape libraries, to control the flow of data between primary and secondary storage facilities.

In a hierarchical storage management system, data is stored in different types of storage devices depending upon the frequency of usage of the data. For instance, a system may include multiple storage media types to store data having different usage patterns and likelihood of access. More frequently used data may be stored on direct access storage devices (DASD) comprising high-performance rapid access storage devices, such as hard disk drives. Such readily accessible data is sometimes referred to as level zero volumes. Less frequently used data may be archived on slower and less expensive, demountable storage media, such as optical disks, magnetic tape cartridges, etc. Such archive volumes are referred to as level two storage.

Two common functions initiated by host systems in hierarchical storage management systems include migration and recall. Migration involves the movement of data from level 0 to level 2 storage to make more room for more frequently accessed data on the primary level 0 storage devices. If a host system attempts to access a data set that has been migrated to level 2 storage, then the recall function would be initiated to move the requested data sets from the level 2 storage to level 0.

International Business Machines Corporation (IBM®) provides the Data Facilities Storage Management Subsystem (DFSMS®) software which is included in the IBM MVS/ESA™ and OS/390® operating systems. This software allows host systems to perform hierarchical storage management operations, such as migration and recall. DFSMS and OS/390 are registered trademarks of IBM, and MVS/ESA is a trademark of IBM. The operation and implementation of the DFSMS system are described in IBM publications "DFSMS/MVS VlR3 General Information," IBM document no. GC26-4900-04 (IBM Copyright, 1980, 1995) and "DFSMS/MVS VlR3 DFSMS/HSM Storage Administration Guide," IBM document no. SH21-1076-02 (IBM Copyright 1984, 1995), which publications are incorporated herein by reference in their entirety.

The OPEN command establishes input/output communications at the application level between an application and a device. The CLOSE command terminates application-level input-output communications between an application and a device. At the Job Control Language (JCL) level, a host, a device, and a data medium are associated, without regard to any particular dataset. At the JCL level, a Data Definition (DD) request, which may be used to allocate a data set, returns the volume serial number (VOLSER) and logical file number of the current storage medium. At the application level, dynamic positioning is possible only by specifying the file number. Prior to the present invention, no means of creating a direct association between a dataset and a device has been provided via the OPEN and CLOSE commands (i.e., allocation and deallocation).

Certain applications used with tape storage devices, typically those that provide writes to a multiplicity of files (i.e., writing data sets to the same tape cartridge or group of cartridges, sometimes referred to as "file-stacking") as a technique to exploit tape capacity and reduce slot requirements, do not have an application-owned control data set or catalog to manage data set locations (e.g., by storing file Block ID locations). Instead, they rely on the system catalog and/or the tape management system to maintain the file sequence number for a particular data set on a tape volume. Since these applications have not saved the Block ID location of files, only the sequence number of the file is available for processing (e.g., via the OPEN command) when the file is recalled from among the multiplicity of files. An n number of repeated Forward Space File commands must be issued to reach file sequence number n. With the capability to store hundreds and thousands of files on a single volume, access to data is severely impeded by this process, which can be quite time consuming. Other applications, e.g., HSM, only use a Block ID for file location, and not the sequence of the file being located or its file number.

Such prior art systems therefore typically have a severe performance penalty associated with the file-oriented positioning that is required to access a specific file on a multi-file tape volume, or to append to the end of such a volume. The performance penalty applies for systems and environments that either do not provide a device command that permits multi-file space operations, or do not provide system software support for the effective use of such a device command. For Enterprise System Connection (ESCON) and native Fibre Connection (FICON) attached devices (IBM.RTM. 5390 systems in particular), no device architectures exist which support such operations, nor does system software exist which supports such commands. Where hundreds or thousands of files exist on a tape volume and one must position to one of the latter files, the positioning itself, today accomplished one file or tape mark at a time, may take over two orders of magnitude more time to accomplish than the actual data transfer.

Further, some tape storage products, e.g., IBM.RTM. 3590 drives, cannot perform efficient file locations when used with certain (e.g., backup or tape server) applications, and therefore the service levels required by their users do not match their recall capability. Users of such products often wish to exploit the capability of such products to perform high-speed locate on a file sequence number. In a preferred implementation, indexing information is maintained in a region of the data storage media itself known as the volume control region (VCR). The VCR maintains the data and supports the interfaces required to provide this function. An interface is thus needed to support the drive capabilities by offering high-speed location to absolute or relative file positions.

Moreover, in addition to gaining fast access in opening files, such file positioning commands have an additional potential advantage: When the VCR region of a tape becomes corrupted, fast access to data by any means (Block ID or File Number) is not possible. Today, rebuilding the VCR requires reading the entire tape. A function that would issue a command to high-speed locate to the End of Tape marker could provide a far more efficient method to accomplish the VCR rebuild task.

Thus, a system and method for fast file positioning is needed, wherein the system architecture for fast tape file positioning encompasses microcode components, system software components, and application components.

SUMMARY OF THE INVENTION

Applicants' invention provides fast read performance for accessing a file from among a multiplicity of files when its corresponding Block ID is unavailable, by furnishing new file-positioning commands (e.g., as subsets of the OPEN command), allowing access to data based on File Number, at the same fast locate speed as with Block IDs. This capability thus expands the range of applications that can use certain tape drive systems (e.g., Magstar 3590 tape drives) effectively.

The present invention includes both a device architecture for supporting the file oriented positioning and the appending, as well as a software system that can permit easy application access to the device facilities and system components which permit the advantages to accrue without any software application or operator changes. It is contemplated that the high-speed file location occurs at the highest speed supported by the device (head indexing in milliseconds, followed by operations at fast forward or rewind speed). Command and software architecture may also be provided for sensing current file position and maximum recorded files on the volume. In certain embodiments, the software architecture is fully extended to support multi-volume aggregates transparently to the application and with full integrity. Additional device architecture may support location to sequential tape marks, and to absolute locations on tape specified in units idiosyncratic to the device, the latter command architecture being likely to have utility for recovery programs.

The present invention comprises several device command innovations. One is a relative positioning command, which permits positioning (relative to current position) based on blocks, tape marks, sequential tape marks, or end of data marks. Another is an absolute positioning command, which permits positioning (independent of current position) to a given block, tape mark, sequential tape mark, or device-specific position (such as a wrap counter and tachometer counter). Coupled with these commands may be other commands for sensing current position, for reporting the nature of a given tape structure encountered, for reporting the maximal number of files or blocks on a tape (or logging these facts), as well as a full error reporting architecture for supporting their use, e.g., in a 24-by-7 high availability system.

The system software works synergistically with the device to provide the overall groundwork for the application performance advantages. The software integrates the support of the positioning commands in a number of forms. In particular, it may be integrated into the pre-existing macros to set and determine position (known as NOTE and POINT in an exemplary implementation), both in relative and absolute forms. For positioning at the point of opening a new file or an existing one, the software provides direct integration in the macros pertain to file opening (e.g., OPEN in an exemplary implementation). Finally, the device capability is surfaced all the way to the user level via Job Control Language (JCL) support in the File Number. Again, this is accomplished with no external changes to the application programmer or operator.

One of the most significant innovations at the software level is the integration of this support to fully accommodate multi-volume aggregates. In this case, one does not know which volume in the aggregate is the actual repository of the desired information (or which contains the desired file specified). The system software takes advantage of any known and provided information to maximize performance. In the worst case, the first volume is mounted and the last file determined by the supported command, which provides this at load time. The software validates this information by reading the trailer labels of the final file (normally near the physical beginning of tape for serpentine tape architectures). If the desired file is not on the currently mounted tape, the next tape in the sequence of the aggregate is mounted and the same process repeated with file numbering information appropriately adjusted. When the correct volume is mounted, then the proper calculations are done to accommodate the arithmetic for the file label format currently active, and the positioning is done at high speed.

It is noted that the highest speed operation of this process will diminish if the native indexing capabilities of the device have been compromised due to a failure of some kind that blocked the indexing. In that case, the software still operates transparently, although the performance advantage is lost. In an exemplary implementation, the software system also has integrated into the tape initialization subsystem the capacity to recognize a tape with an impaired positioning index and the ability to rebuild that index using one of the new device commands which forces read speed positioning to final position of the most recent recording on the media (and, consequently, causes the device to rebuild its index).

BRIEF DESCRIPTION OF THE DRAWINGS

The invention will be better understood from a reading of the following detailed description taken in conjunction with the drawings in which like reference designators are used to designate like elements, and in which:

FIG. 6 is a flowchart illustrating an exemplary protocol for locating to a given file in a multivolume aggregate, in one embodiment of the invention;

FIG. 8A is a flowchart illustrating certain the steps of the Position Absolute (POSAB) command, in one embodiment of the invention;

DETAILED DESCRIPTION OF THE PREFERRED EMBODIMENTS

The present invention provides several new commands (or "interfaces") to enable tape positioning based on file numbers, providing the capability for high-speed access to data by specifying a File Number. These commands are:

Position Relative (POSREL) command, used to space any given positive or negative number of file marks at high speed.

Position Absolute (POSAB) command, used to perform high-speed locate to the beginning of any specific file.

Position Sense (POSNS) command, used to obtain the current File Number position.

Further, in READ DEVICE CHARACTERISTICS (RDC) data, new bits are provided to indicate that each of these new commands is supported. The Position Relative command will provide the more convenient high-speed alternative to the current use of repeated Forward Space File commands to access the desired file on tape. However, the other positioning commands provide alternatives that can be considered in fulfilling the requirement for high-speed access when only File Number, and not Block ID, is available. The POSAB, POSREL and POSNS commands have further utility in providing a robust architecture for navigating residual data, e.g., for data recovery.

Referring to the illustrations, like numerals correspond to like parts depicted in the figures. The invention will be described as embodied in an automated data storage and retrieval subsystem for use in a data processing environment. The following description of Applicant's method to record information to a movable tape medium, or to a movable tape medium disposed within a portable data storage cartridge is not meant, however, to limit Applicant's invention to either data storage and retrieval systems, or to magnetic tape applications, as the invention herein can be applied to data storage media in general.

Figure 3:
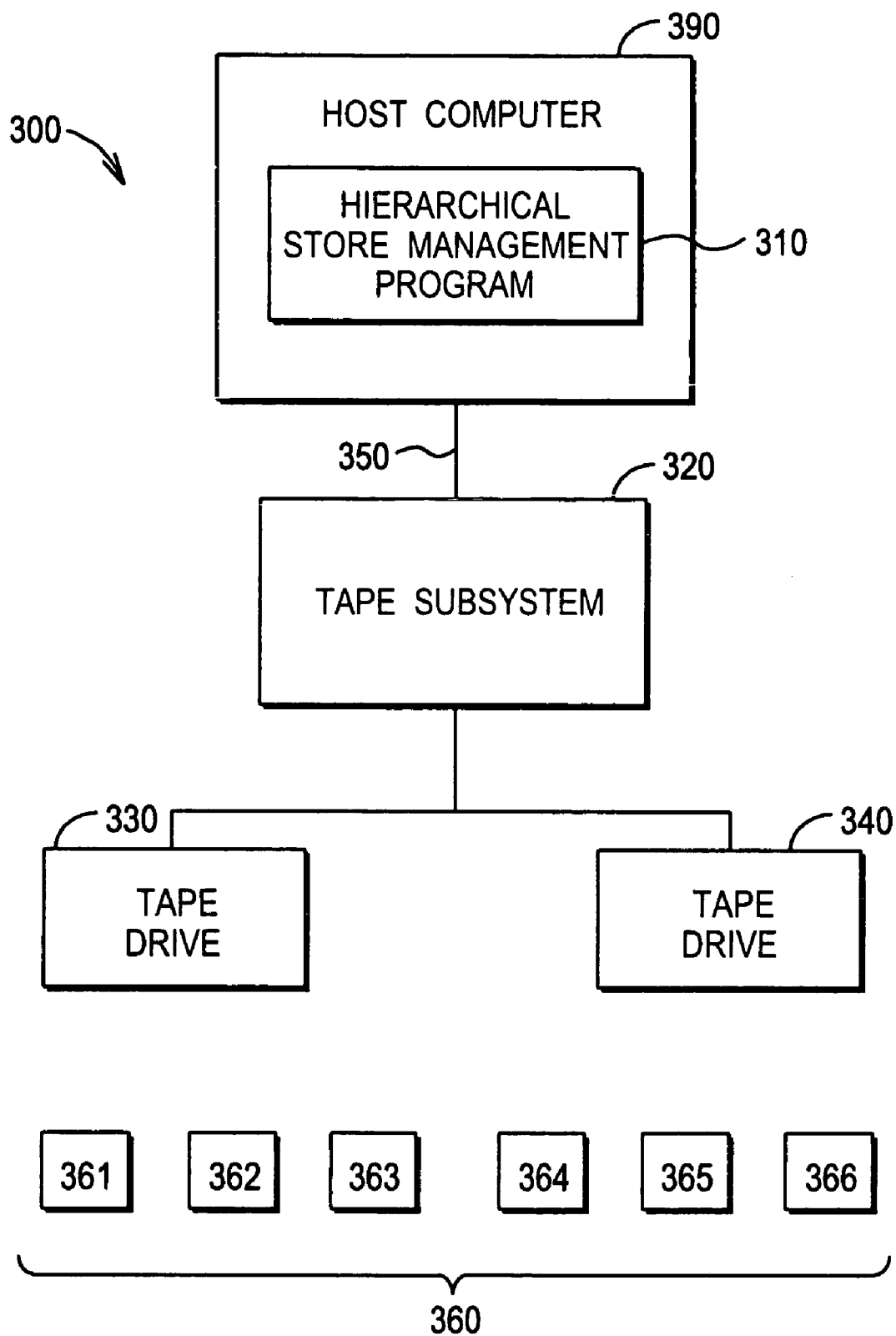
FIG. 3 is a block diagram showing the hardware and software components of Applicants' data storage and retrieval system.

FIG. 3 illustrates an exemplary hardware and software system 300 in which embodiments of the present invention may be implemented, including a host system 390, a tape subsystem 320, and a plurality of tape drives 330, 340. Host system 390 includes Applicants' hierarchical storage management (HSM) program 310. Information is transferred between the host system 390 and secondary storage devices managed by a data storage and retrieval system, such as tape subsystem 320, via communication link 350. Communication link 350 comprises a serial interconnection, such as an RS-232 cable or an RS-432 cable, an ethernet interconnection, a SCSI interconnection, a Fibre Channel interconnection, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, tape subsystem 320 includes tape drives 330 and 340. In other embodiments of Applicants' data storage and retrieval system, tape subsystem 320 includes a single data storage drive. In alternative embodiments, Applicants' data storage and retrieval system 320 includes more than two data storage drives.

A plurality of portable data storage media 360 are stored within Applicants' data storage and retrieval system. In certain embodiments, a plurality of data storage media 360 are each housed in a portable data storage cartridge, such as a plurality of portable tape cartridges (not shown in FIG. 3). Each of such portable data storage cartridges may be inserted in one of tape drives, and thereafter accessed by the tape subsystem 320. In alternative embodiments, alternative storage media may be substituted for the tape cartridges. Any type of non-volatile storage media could be used, including optical disks, holographic units, digital video disc (DVD), compact disc-read only memory (CD-ROM), non-volatile random access memory (RAM), etc. For ease of reference, all such data storage media are referred to herein as "tape cartridges" or "data storage cartridges", although it should be recognized that the invention is not strictly limited to tape cartridges.

The tape subsystem 320 further includes program logic to manage tape drives 330 and 340, and plurality of data storage cartridges 360. In alternative embodiments, tape subsystem 330 and host system 390 may be located on a single computer machine.

Host system 390 comprises a computer system, such as a mainframe, personal computer, workstation, etc., including an operating system such as Windows, AIX, Unix, MVS, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The HSM program 310 in the host system 390 may include the functionality of HSM type programs known in the art that manage the transfer of data to a tape library, such as the IBM DFSMS implemented in the IBM MVS operating system.

The IBM DFSMS software is described in "DFSMS/MVS V1R4 General Information," IBM document no. GC26-4900-05, published by IBM (Copyright 1997, IBM), which publication is incorporated herein by reference in its entirety. In addition to including known HSM functions, such as recall and migration, the HSM program 310 would further include additional program instructions to perform the operations of the preferred embodiments of the present invention. The HSM program 310 may be implemented within the operating system of the host system 390 or as a separate, installed application program.

Figure 2:
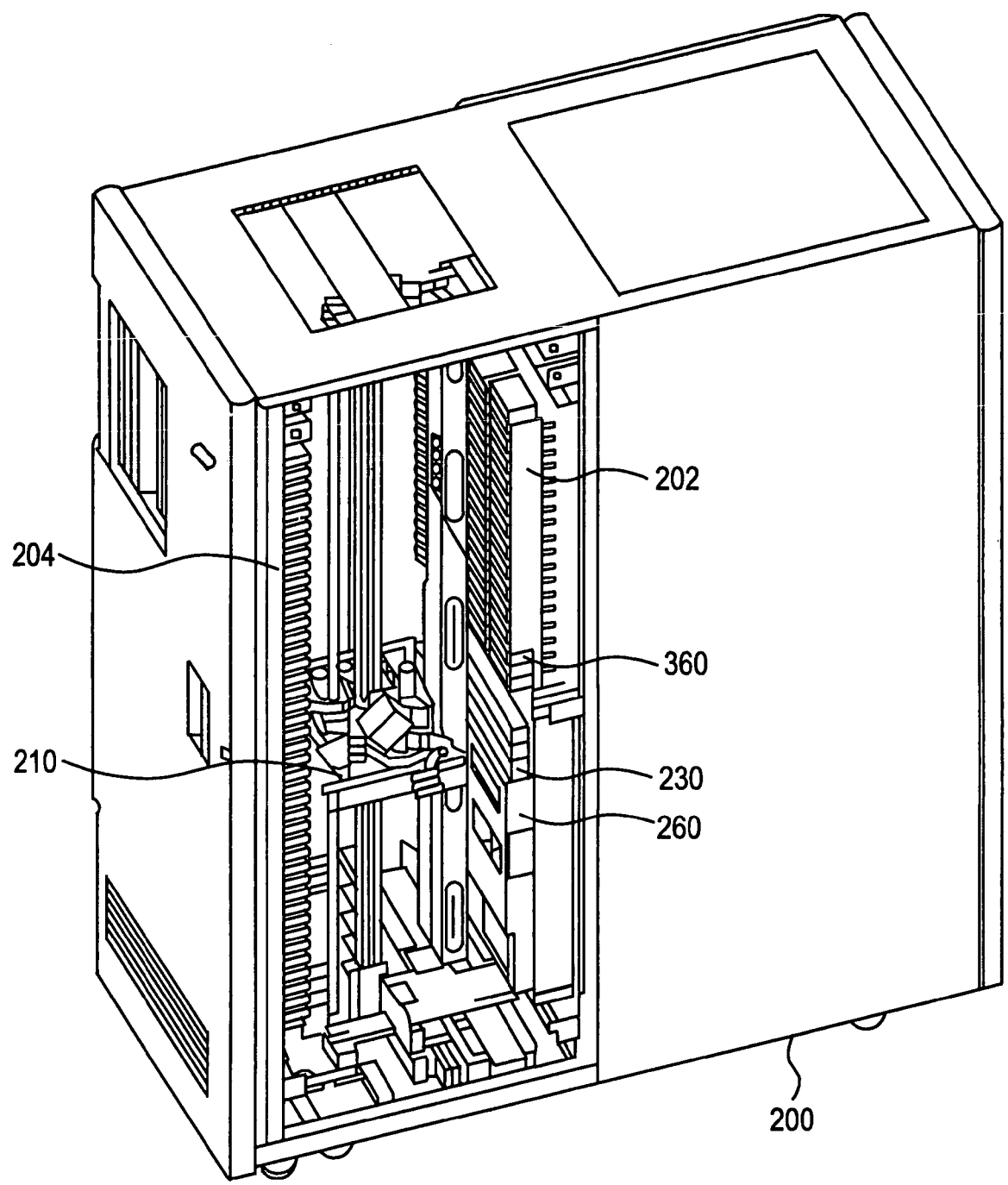
FIG. 2 is a perspective view of a second embodiment of Applicants' data storage and retrieval system.

The tape subsystem 320 comprises a computer system, and manages a plurality of tape drives and tape cartridges. The tape drives 330 and 340 may be any suitable tape drives known in the art, e.g., the Magstar 3590 tape drives. Data storage cartridges 360 may be any suitable tape cartridge device known in the art, (Magstar is a registered trademark of IBM Corporation) such as ECCST, Magstar, IBM 3420, 3480, 3490E, 3590 tape cartridges, etc. The tape subsystem 320 may be a manual tape library in which the user must manually mount data storage cartridges (in this case, tape cartridges 360, as shown in FIGS. 2 and 3) into the tape drives 330/340, or an automated tape library (ATL) in which a robotic arm mounts tape cartridges 360 in the library into the tape drives 330/340.

Figure 1A:
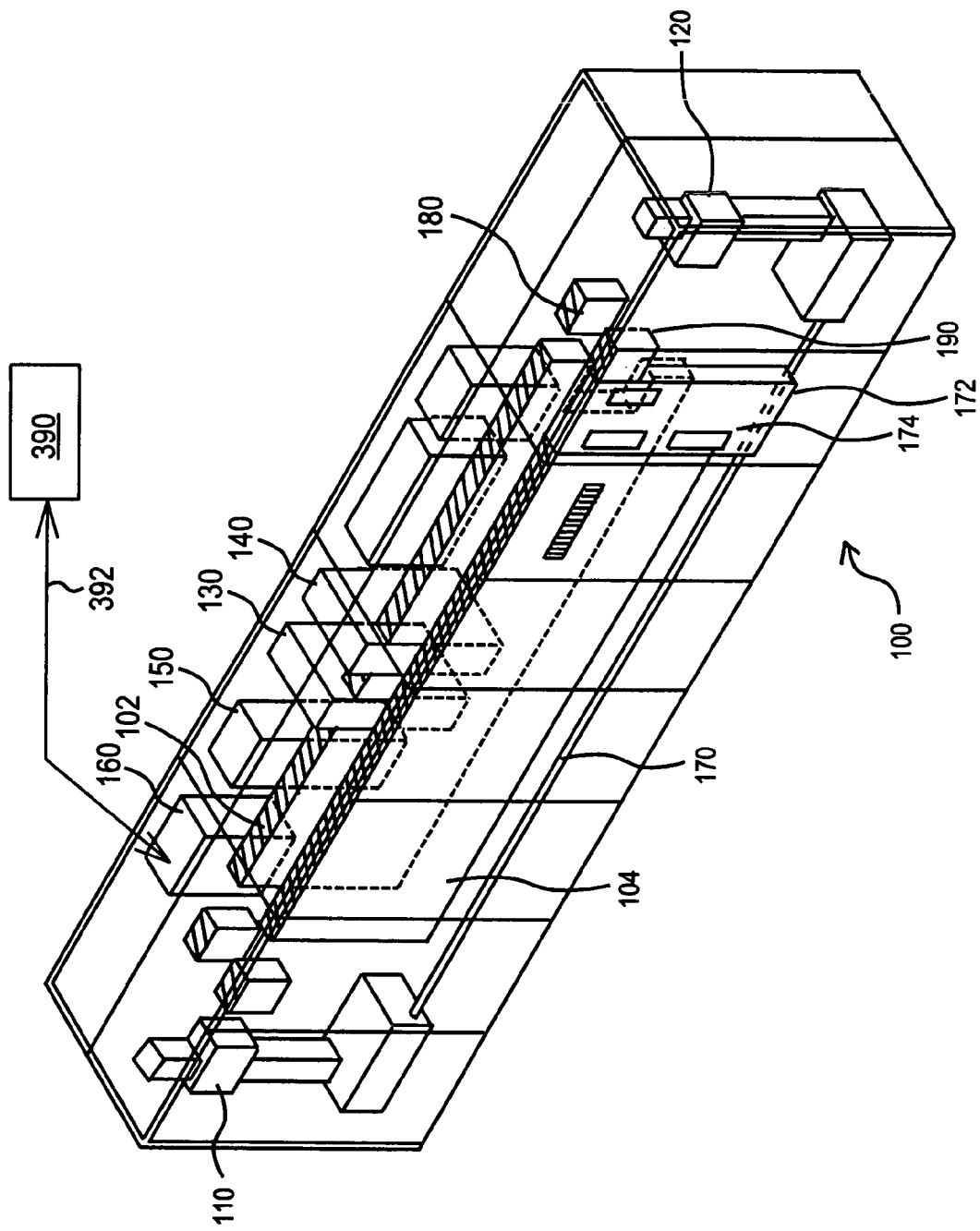
FIG. 1A is a perspective view of a first embodiment of Applicants' data storage and retrieval system.

For example, referring now to FIG. 1A, automated data storage and retrieval system 100 is shown having a first wall of storage slots 102 and a second wall of storage slots 104. Portable data storage cartridges 360 (not shown in FIG. 1A), such as tape cartridges, are individually stored in these storage slots.

Figure 1B:
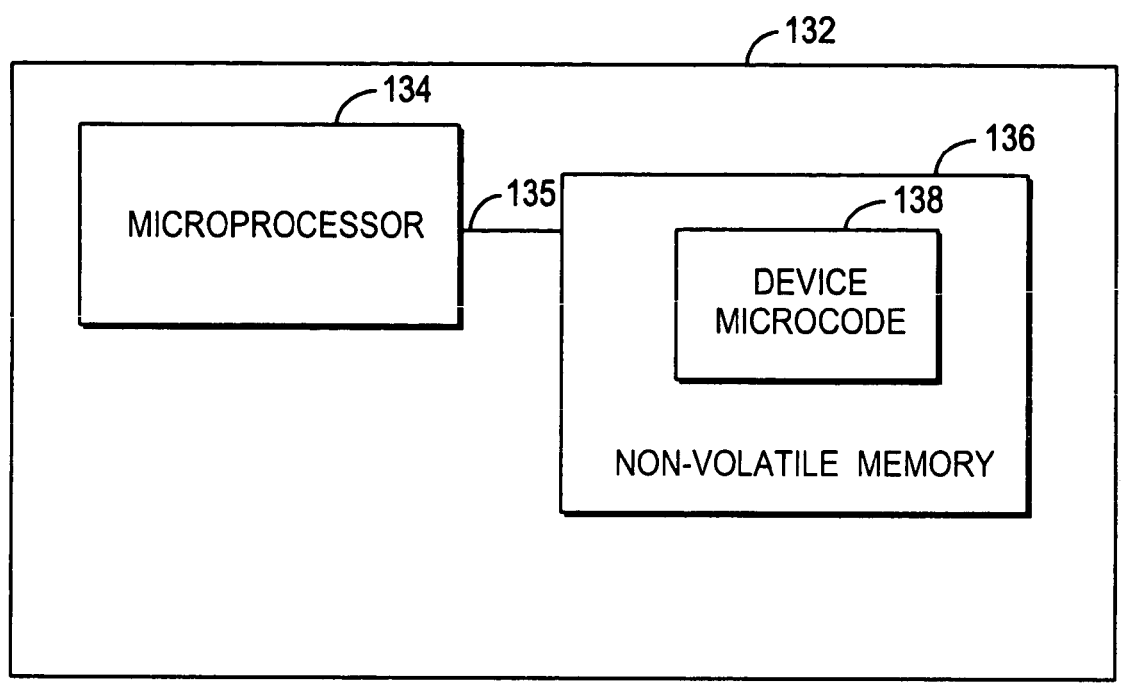
FIG. 1B is a block diagram showing certain components disposed in the controller disposed in Applicants' data storage and retrieval system.

Data storage and retrieval system 100 includes one or more accessors, such as accessors 110 and 120. An accessor is a robotic device which accesses portable data storage media from first storage wall 102 or second storage wall 104, delivers that accessed media to data storage devices 130/140 for reading and/or writing data thereon, and returns the media to the proper storage slot. Referring now to FIG. 1B, data storage device 130 includes device controller 132. Controller 132 includes microprocessor 134 in communication with non-volatile memory 136. In certain embodiments, microprocessor 134 communicates with non-volatile memory 136 via communication link 135. In other embodiments, non-volatile memory 136 is integral to microprocessor 134. Device microcode 138 is stored in non-volatile memory 136. Device microcode comprises a computer program product which controls the operation of a data storage device, such as data storage device 130 (FIG. 1A)/140 (FIG. 1A)/230 (FIG. 2).

Figure 1C:
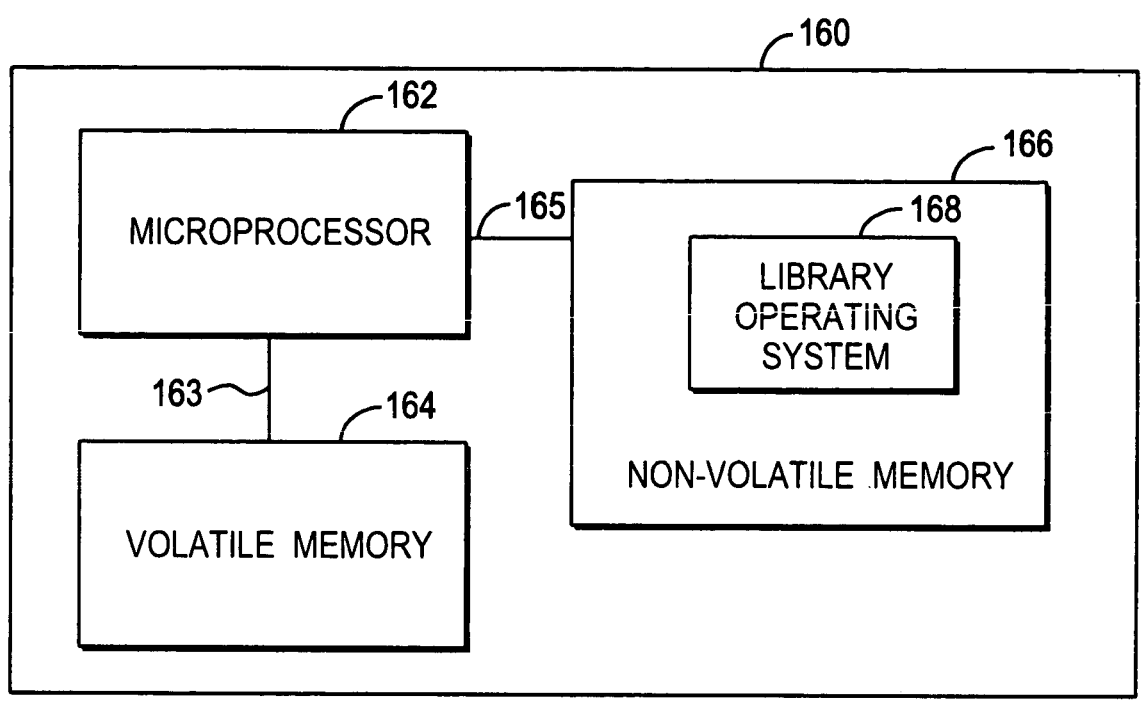
FIG. 1C is a block diagram showing certain components disposed in Applicants' data storage device.

Library controller 160 communicates with host computer 390 via communication link 392. Referring now to FIG. 1C, library controller 160 includes microprocessor 162, volatile memory 164, and non-volatile memory 166. In certain embodiments, microprocessor communicates with volatile memory 164 via communication link 163. In other embodiments, volatile memory 164 is integral to microprocessor 162. Microprocessor 162 communicates with non-volatile memory 166 via communication link 165. Library operating system 168 is stored in non-volatile memory 166. Operating system 168 comprises a computer program product that controls the operation of data storage and retrieval systems 100 (FIG. 1A)/200 (FIG. 2), and tape subsystem 320 (FIG. 3).

Referring once again to FIG. 1A, operator input station 150 permits a user to communicate with Applicant's automated data storage and retrieval system 100. Devices 180 and 190 each comprise a Direct Access Storage Device (DASD) cache. In certain embodiments DASD cache 180 and 190 comprise a plurality of hard disk drives, which are configured into one or more RAID arrays. In certain embodiments, information transferred between host computer 390 and data storage and retrieval system 100 is buffered in DASD caches 180 and 190. Import/export station 172 includes access door 174 pivotably attached to the side of system 100. Portable data storage cartridges can be placed in the system, or in the alternative, removed from the system, via station 172/access door 174.

FIG. 2 shows system 200, which comprises another embodiment of Applicant's data storage and retrieval system. System 200 includes first storage wall 202 and second storage wall 204. Storage walls 202 and 204 each include a plurality of storage elements in which can be stored a plurality of portable data storage cartridges 360. System 200 includes one or more data storage devices, such as device 230. Device 230 comprises a floppy disk drive, an optical disk drive, a magnetic tape drive, and the like. System 200 further includes operator control panel 250 (not shown in FIG. 3).

As shown in FIG. 2, system 200 further includes library controller 260. Library controller 260 controls the operation of accessor 210 and data storage device 230. As shown in FIG. 3, system 300 further includes one or a plurality of portable data storage cartridges, such as tape cartridges 360, each of which contains data storage media internally disposed therein.

Referring again to FIG. 3, tape subsystem 320, such as data storage and retrieval system 100 (of FIG. 1A)/200 (of FIG. 2), receives commands from the HSM program 310 in the host system 390 and performs the operations requested by the HSM program 310, such as migration and recall, to transfer data between the host system 390 and the components managed by the tape subsystem 320. In preferred embodiments, the tape subsystem 320 can simultaneously process numerous input/output requests from the host system 390 and any other attached system directed toward the tape drives 330/340 and tape cartridges 360 managed by the tape subsystem 320. Moreover, in certain embodiments, HSM program 310 in the host system 390 is capable of multi-tasking, simultaneously executing numerous input/output operations, and simultaneously transmitting multiple I/O requests to the tape subsystem 320 to execute.

In further embodiments, a plurality of host systems 390 may communicate with the tape subsystem 320 and/or a host system 390 may communicate and transfer data to a plurality of tape subsystems 320, each subsystem providing access to a library of tape cartridges 360.

Position Relative

Figure 4:
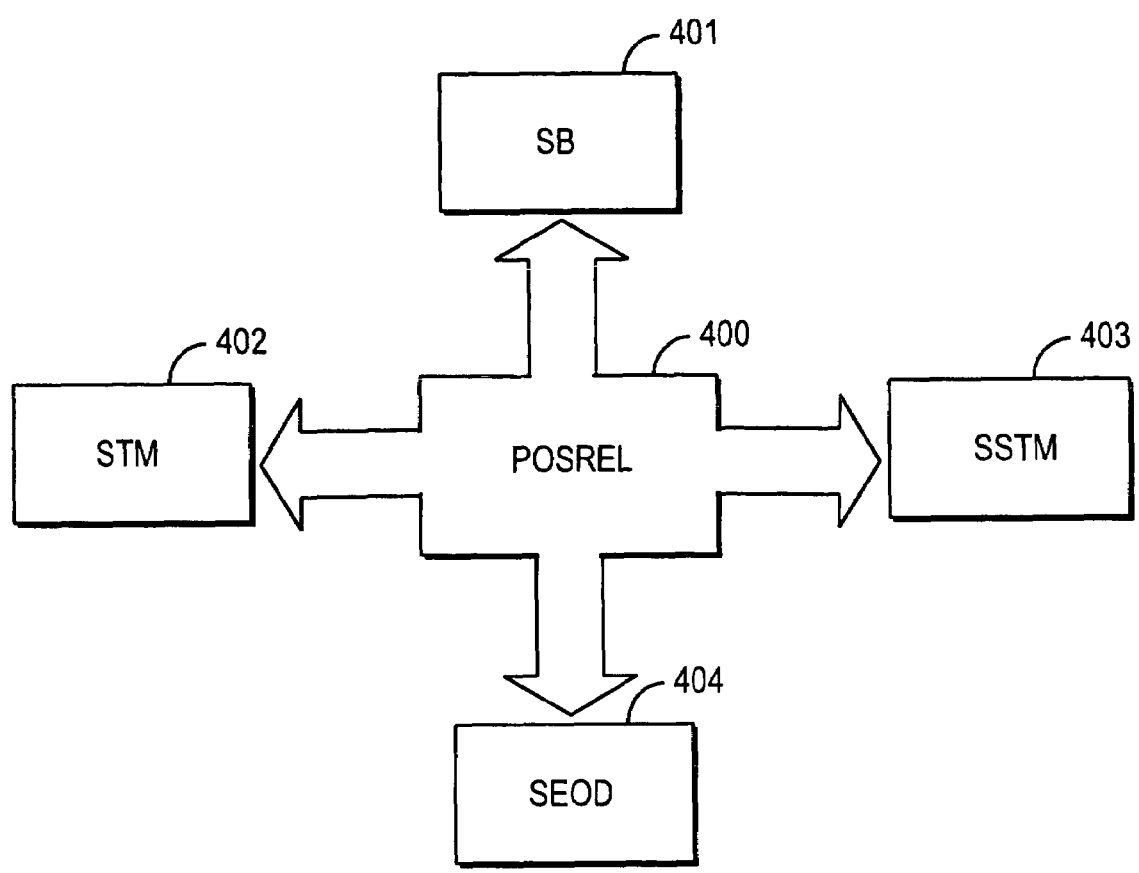
FIG. 4 is a block diagram graphically representing the Position Relative (POSREL) command and its order parameters, in one embodiment of the invention.
Figure 5A:
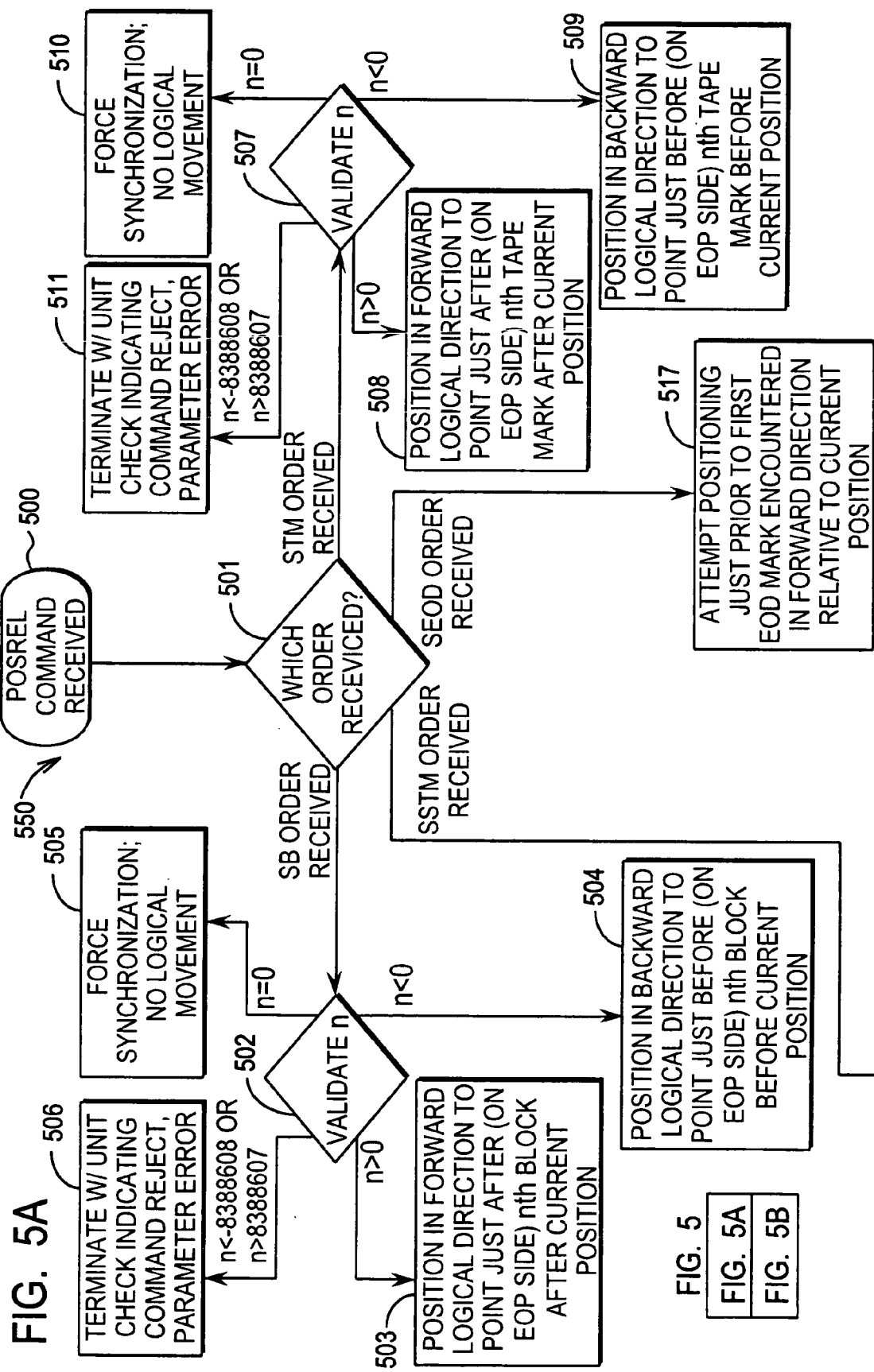
FIG. 5A is a flowchart illustrating certain of the steps of the Position Relative (POSREL) command, in one embodiment of the invention.
Figure 5B:
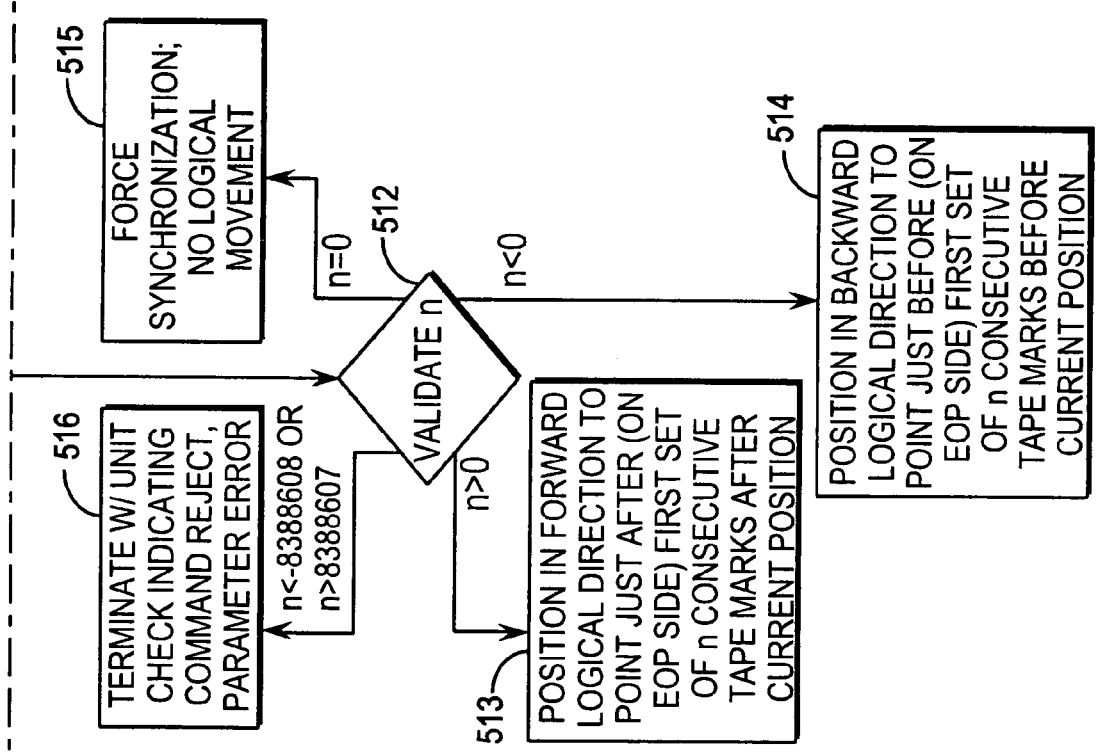
FIG. 5B is a flowchart illustrating certain additional steps of the Position Relative command.

As illustrated in FIGS. 4 (a graphical representation of the POSREL command) and 5 (a flowchart 550 representing the steps of the POSREL command), the present invention comprises a new Position Relative (POSREL) command 400, which requests the logical medium to be adjusted to a position relative to the current logical medium position. An exemplary POSREL command 400 causes 8 bytes of data to be transferred from the channel to the control unit, which may occur synchronously or asynchronously. In asynchronous operation, such data may include a bit to notify the program of completion of the positioning. Order parameters may be further specified, wherein a Command Reject, Parameter Error may be returned if an undefined order code is specified. As FIGS. 4 and 5 illustrate, in one exemplary embodiment, order codes of Position Relative 400 may include Space Block (SB) 401, Space Tape Mark (STM) 402, Space Sequential Tape Mark (SSTM) 403, and Space End Of Data (SEOD) 404. As shown in FIG. 5, when a POSREL command is received, at step 500, a determination is made regarding which order code is received, at step 501.

The Space Block (SB) order 401 of the POSREL command 400 causes relative positioning on a logical block basis. If, at step 501, a determination is made that an SB order has been received, the value of the Count argument (n) is determined, at step 502. A positive value, n, of the Count argument causes positioning in the forward logical direction to point just after (on the End of Partition (EOP) side) the nth block after the current position, at step 503. A negative value of n causes positioning in the backward logical direction to point just before (on the Beginning of Partition (BOP) side) the nth block before the current position, at step 504. File marks are counted as logical blocks, just as data logical blocks; however, a Space Block order 401 which encounters a tape mark will normally complete with a unit exception and the logical medium will remain positioned just following (respectively prior to) the first tape mark encountered when moving in the forward (respectively backward) direction. The order is subject to unit checks for BOP, EOP, void, or Beginning of Data (BOD) encountered. The order is not subject to unit exception for Logical End of Partition (LEOP) encountered. The Count argument specifies a twos complement value which is used to specify the number of logical blocks to skip over from the current logical medium position. A positive Count indicates motion in the logical forward direction (towards EOV or EOP), at step 503. A negative Count indicates motion in the logical backwards direction (towards Beginning of Volume (BOV) or BOP), at step 504. A Count of zero results in no logical movement of the medium, at step 505; however, it does force a synchronization. In one embodiment, only values between −8388608 and +8388607 are permitted. If a Count value more negative than −8388608 or more positive than +8388607 is specified, then the order will terminate with unit check indicating Command Reject, Parameter Error, at step 506. This order is subject to the same unit checking rules as those for the Forward Space Block and Backward Space Block commands. This order may also be subject to data checks or sequence checks depending on the settings specified in Device Control Page 3 for Space Block 401 commands. In addition, it may be subject to Boundary Exceptions for Forward at EOP, Backward at BOP, and End of Data Mark, as well as Data Check for Void. Synchronization of any buffered write data will be attempted when this order is accepted. In a residual data domain (i.e., unindexed data left in a data medium beyond an end of data (EOD) mark, after deletion of a file or a portion of a file, that remains recoverable until sanitizing of the data medium has taken place), all commands continue to operate as specified, however, all positioning (Locate (LOC), Forward Space File (FSF), Backward Space File (BSF), Forward Space Block (FSB), Backward Space Block (BSB), POSREL 400, POSAB 700) will be performed at read speed only (i.e., relatively slowly). Crossing an End of Data (EOD) boundary into a residual data domain can only occur if permitted by Device Control Page 3 (DCP3). The first motion command which attempts to cross EOD will be terminate with unit check status indicating Boundary Exception, End of Data encountered. A subsequent motion command will likely terminate with unit check status indicating Data Check, Block Sequence error. A third motion command will normally succeed. If unit exception status or unit check status is returned to the POSREL command 400 then the current actual position on tape may not be known since anywhere between 0 and n blocks may have been spaced over when the error occurred. Therefore, before issuing the POSREL command 400, the host software should: a) issue a Read Block Identifier (RBID) command and save the returned Block ID as the "Starting Block Position" value and b) save the initially requested Count field passed in with the POSREL command 400 as the "Requested Block Count" value. In addition, after the POSREL command 400 has failed with either the unit exception status or the unit check status, the host software will need to issue another RBID command and save the returned Block ID as the "Ending Block Position" value. These saved values can then be used as aids in recovery for when either the unit exception status is returned due to having encountered a tape mark or when the unit check status is returned. It is also noted that if the unit check status is due to a lost positioning type of error then the only recovery possible is either a rewind or an unload of the tape.

The Space Tape Mark (STM) order 402 of the Position Relative command 400 causes relative positioning on a tape mark basis. If, at step 501, a determination is made that an STM order has been received, the value of the Count argument (n) is determined, at step 507. A positive value of the Count argument, n, causes positioning in the forward logical direction to point just after (on the EOP side) the nth tape mark after the current position, at step 508. A negative value of n causes positioning in the backward logical direction to point just before (on the BOP side) the nth tape mark before the current position, at step 509. The order is subject to unit checks for BOP, EOP, void, or EOD encountered. The Space Tape Mark order 402 will not complete with unit exception due to a tape mark encountered. The order is not subject to unit exception for LEOP encountered. The Count argument specifies a twos complement value which is used to specify the number of tape marks to skip over from the current logical medium position. A positive Count indicates motion in the logical forward direction (towards EOV or EOP), at step 508. A negative Count indicates motion in the logical backwards direction (towards BOV or BOP), at step 509. A Count of zero performs no operation except for synchronization, at step 510. Only Court values between −8388608 and +8388607 are permitted. If a Count value more negative than −8388608 or more positive than +8388607 is specified, then the order will terminate with unit check indicating Command Reject, Parameter Error, at step 511. This order is subject to the same unit checking rules as those for the Forward Space File and Backward Space File commands. This order may also be subject to data checks or sequence checks depending on the settings specified in Device Control Page 3 for space file commands. In addition, it is subject to Boundary Exceptions for Forward at EOP, Backward at BOP, and End of Data Mark, as well as Data Check for Void. Synchronization of any buffered write data will be attempted when this order is accepted. In a residual data domain, all commands continue to operate as specified, however, all positioning (LOC, FSF, BSF, FSB, BSB, POSREL 400, POSAB 700) will be performed at read speed only. Crossing an EOD boundary into a residual data domain can only occur if permitted by DCP3. The first motion command which attempts to cross EOD will be terminate with unit check status indicating Boundary Exception, End of Data encountered. A subsequent motion command will likely terminate with unit check status indicating Data Check, Block Sequence error. A third motion command will normally succeed. If unit check status is returned to the POSREL command 400 then the current actual position on tape may not be known since anywhere between 0 and n tape marks may have been spaced over when the error occurred. Therefore, before issuing the POSREL command 400, the host software should: a) issue a RBID command and save the returned Block ID as the "Starting Block Position" value and b) issue a POSNS command (described hereinbelow) and if the File Number field is indicated as valid then save the returned File Number as the "Starting File Position" value and c) save the initially requested Count field passed in with the POSREL command 400 as the "Requested Tape Mark Count" value. In addition, after the POSREL command 400 has failed with the unit check status, the host software will need to: a) issue another RBID command and save the returned Block ID as the "Ending Block Position" value and b) issue another POSNS command and if the File Number field is indicated as valid then save the returned File Number as the "Ending File Position". These saved values can then be used as aids in recovery for when the unit check status is returned. Note that if either of the saved File Number values from the POSNS command are not valid then the host will have to rely solely on using the saved block IDs returned by the RBID commands for the recovery process. It is also noted that if the unit check status is due to a lost positioning type of error then the only recovery possible is either a rewind or an unload of the tape.

The Space Sequential Tape Mark (SSTM) order 403 of the Position Relative command 400 causes relative positioning on a sequential (multiple adjacent) tape mark basis (as with End Of Data Set (EODS) marks on a volume). If, at step 501, a determination is made that an SSTM order has been received, the value of the Count argument (n) is determined, at step 512. A positive value of the Count, n, causes positioning in the forward logical direction to point just after (on the EOP side) the first set of n consecutive tape marks (n tape marks with no interspersed data logical blocks) following the current position, at step 513. A negative value of n causes positioning in the backward logical direction to point just before (on the BOP side) the first of a set of n consecutive tape marks before the current position, at step 514. The order is subject to unit checks for BOP, EOP, void, or EOD encountered. The Space Sequential Tape Mark order 403 will not complete with unit exception due to a tape mark encountered. The command is not subject to unit exception for LEOP encountered. The Count argument specifies a twos complement value which is used to specify the number of consecutive sequential tape marks to search for starting from the current logical medium position. A positive Count indicates motion in the logical forward direction (towards EOV or BOP), at step 513. A negative Count indicates motion in the logical backwards direction (towards BOV or BOP), at step 514. A Count of zero performs no operation except for synchronization, at step 515. Only Count values between −8388608 and +8388607 are permitted. If a Count value more negative than −8388608 or more positive than +8388607 is specified, then the command will terminate with unit check indicating Command Reject, Parameter Error, at step 516. This order is subject to the same unit checking rules as those for the Forward Space File and Backward Space File commands. This order may also be subject to data checks or sequence checks depending on the settings specified in Device Control Page 3 for space file commands. In addition, it is subject to Boundary Exceptions for Forward at EOP, and Backward at BOP, and End of Data Mark, as well as Data Check for Void. Synchronization of any buffered write data will be attempted when this order is accepted. The last data set on a volume is normally terminated with two consecutive tape marks. If a count of 2 is specified and a set of 3 consecutive tape marks are encountered while searching in the forward direction (before any single pair of tape marks) the command completes with good status positioned after the second of the 3 tape marks. In a residual data domain, all commands continue to operate as specified, however, all positioning (LOC, FSF, BSF, FSB, BSB, POSREL 400, POSAB 700) will be performed at read speed only. Crossing an EOD boundary into a residual data domain can only occur if permitted by DCP3. The first motion command which attempts to cross EOD will be terminate with unit check status indicating Boundary Exception, End of Data encountered. A subsequent motion command will likely terminate with unit check status indicating Data Check, Block Sequence error. A third motion command will normally succeed. If unit check status is returned to the POSREL command 400 then the current actual position on tape will likely not be known since a search for the first occurrence of n sequential tape marks was being made when the failure occurred. Therefore it is recommended that before issuing the POSREL command 400 the host software should: a) issue a RBID command and save the returned Block ID as the "Starting Block Position" value and b) save the initially requested Count field passed in with the POSREL command 400 as the "Requested Number of Sequential Tape Marks" value. These saved values can then be used as aids in recovery for when the unit check status is returned. It is also noted that if the unit check status is due to a lost positioning type of error then the only recovery possible is either a rewind or an unload of the tape.

The Space End Of Data (SEOD) order 404 of the Position Relative command 400 causes the logical medium to attempt positioning just prior to the first End Of Data mark encountered in the forward direction relative to the current position. SEOD positioning occurs, at step 517, if, at step 501, a determination is made that an SEOD order has been received. The order is subject to unit checks for void or BOP encountered. The order is not subject to unit exception for LEOP encountered. The Count field is ignored for this order. Values are not checked. This order is subject to the same unit checking rules as those for the Forward Space File and Backward Space File commands. This order may also be subject to data checks or sequence checks depending on the settings specified in Device Control Page 3 for space file commands. However, it is not subject to Boundary Exception, End of Data, but it is subject to Boundary Exception, Forward at EOP, as well as Data Check for Void. Synchronization of any buffered write data will be attempted when this order is accepted. In a residual data domain, all commands continue to operate as specified, however, all positioning (LOC, FSF, BSF, FSB, BSB, POSREL 400, POSAB 700) will be performed at read speed only. Crossing an EOD boundary into a residual data domain can only occur if permitted by DCP3. The first motion command which attempts to cross EOD will be terminate with unit check status indicating Boundary Exception, End of Data encountered. A subsequent motion command will likely terminate with unit check status indicating Data Check, Block Sequence error. A third motion command will normally succeed. If unit check status is returned to the POSREL command 400 then the current actual position on tape will likely not be known. Therefore, before issuing the POSREL command 400, the host software should issue a RBID command and save the returned Block ID as the "Starting Block Position" value. This saved value can then be used as an aide in recovery for when the unit check status is returned. It is also noted that if the unit check status is due to a lost positioning type of error then the only recovery possible is either a rewind or an unload of the tape.

Position Relative 400 may have utility during OPEN processing for rapid positioning, especially on a file basis. Proper arithmetic must be done to assure that header and trailer labels are accounted for.

As illustrated in the flowchart 650 of FIG. 6, for locating to a given file in a multivolume aggregate, the following protocol may be used: The process begins at step 600, after which the maximal file written on the medium (reported in new Medium Sense fields as well as Volume Log fields, which are available via the Read Buffered Log command) is checked, at step 601. If the desired file exists on the current volume, which determination is made at step 602, then the correct number of tape marks (using the STM order 402 of Position Relative 400, which is supported for all drives and media) is spaced, at step 606, and header and trailer labels are taken into account, after which execution is complete. If, at step 602, it is determined that the desired file does not exist on the current volume, or if the maximal file written field is indicated as being invalid, then a spacing to End Of Data (SEOD order 404) is performed, the position is backed up, and the final file on the media is checked, at step 603. In an IBM 3590 system, Model E drives and Extended Length media all report a valid current File Number through Position Sense, or the application may have created meta data of its own for determining actual File Number. Except in the case of an invalid maximal file field and with the assumption that the tape is nearly full, the SEOD 404 may execute very rapidly since the Logical End Of Tape is very close to the physical end of tape, just on a different wrap half. The volume is unloaded, at step 604, and the next volume of the aggregate is loaded, at step 605. The procedure of steps 601–6005 is repeated until the desired file is found.

It is noted that the LB (Locate Block) order is functionally equivalent to the LOCATE command.

An LPRI (Locate Physical Reference Index) order may be provided for data recovery programs. If residual data access is not prohibited in DCP3, then LPRI permits the drive to be positioned without regard to logical formatting constructs (end of data marks, logical blocks, tape marks, etc.). Those skilled in the art will recognize that this order should be used with care to avoid data loss or corruption.

The SEOD 404 order of Position Relative 400 may be used for utilities that rebuild a volume's device block map (DBM) to permit subsequent high speed positioning, that is, assuming that the tape volume is not currently write protected. If the DBM is valid, SEOD 404 operates at high speed; if the DBM is not valid, SEOD 404 operates at read speed. On completion, a valid DBM will be rebuilt; on unload the valid DBM will be rewritten to the volume VCR.

Position Absolute

Figure 7:
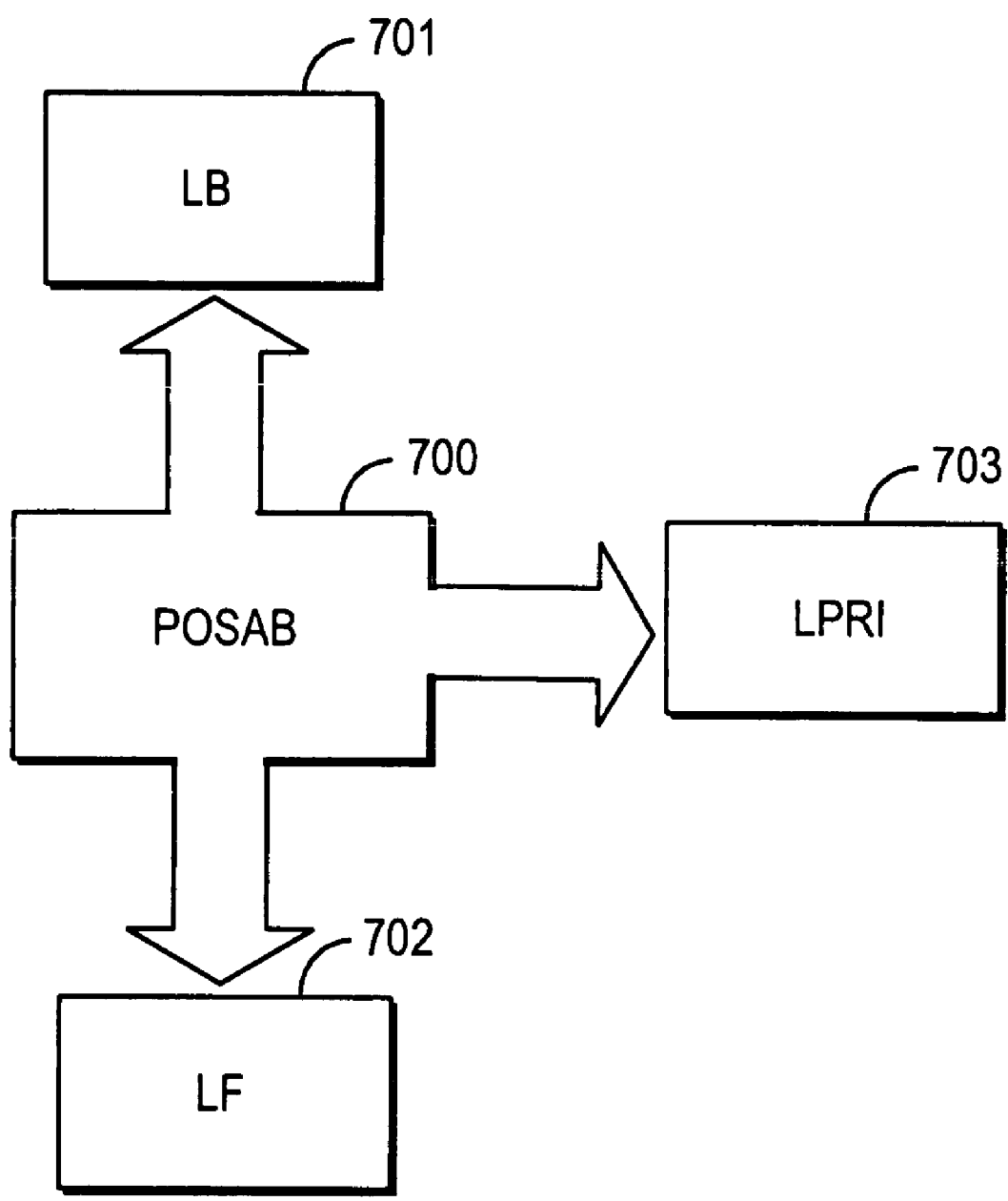
FIG. 7 is a block diagram graphically representing the Position Absolute (POSAB) command and its order parameters, in one embodiment of the invention.
Figure 8B:
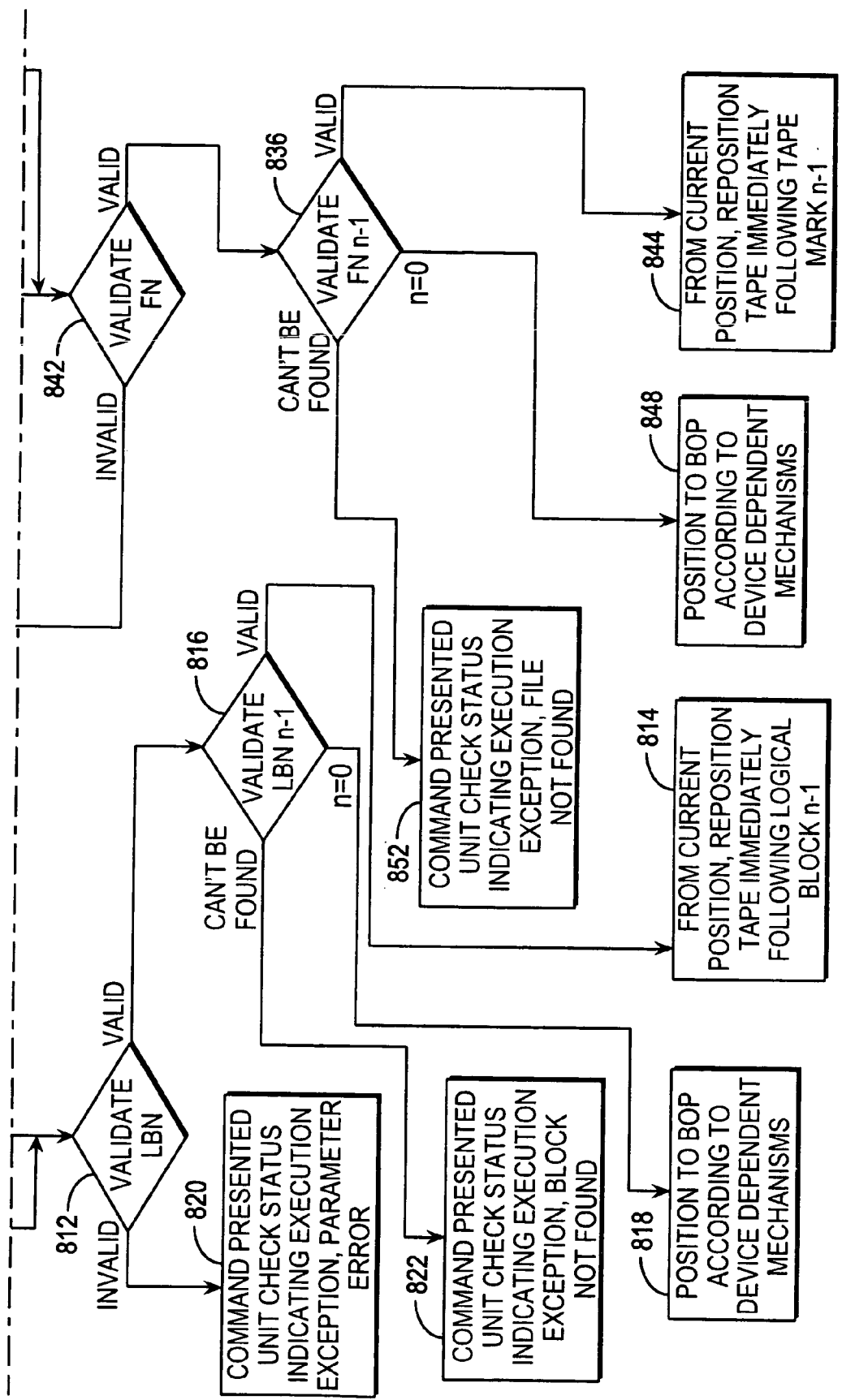
FIG. 8B is a flowchart illustrating certain additional steps of the Position Absolute (POSAB) command.

As illustrated in FIG. 7 (a graphical representation of the POSAB command) and 8 (a flowchart 850 representing the steps of the POSAB command), the present invention comprises a new Position Absolute (POSAB) command 700, which requests the logical medium to be adjusted to the position indicated by the position pointer specified in the parameter data. The command works in conjunction with the data reported by the POSITION SENSE command (as described hereinbelow). An exemplary POSAB command 700 causes 28 bytes of data to be transferred from the channel to the control unit, which may occur synchronously or asynchronously. In asynchronous operation, such data may include a bit to notify the program of completion of the positioning. Order parameters may be further specified, wherein a Command Reject, Parameter Error may be returned if an undefined order code is specified. As FIGS. 7 and 8 illustrate, in one exemplary embodiment, order codes of Position Absolute 700 may include Locate Block (LB) 701, Locate File (LF) 702, and Locate Physical Reference Index (LPRI) 703. As shown in FIG. 8, when a POSAB command 700 is received, at step 800, a determination is made regarding which order code is received, at step 801.

The Locate Block (LB) order 701 of the Position Absolute command 700 requests the logical medium to be adjusted to the logical block indicated by the Logical Block Number and the Partition Number (if valid) Position Pointer specified in the parameter data. The command works in conjunction with the data reported by the Position Sense command. An exemplary LB order causes 28 bytes of data to be transferred from the channel to control unit. This data may include Order Flags; Validity Flags; Identifier Flags; Partition Number (PN); File Number (FN); Logical Block Number (LBN); and Physical Reference Index (PRI). The Order Flags may include bits to indicate synchronous/asynchronous operation of the command, as well as an indicator that program notification of completion will be provided when the command is executing as asynchronously. The Identifier Flags may include bits representing, e.g., Logical Block Number Type (i.e., 22 Bit (Stripped) Logical Block Number or 32 Bit Logical Block Number). The Validity Flags may include bits representing, e.g., Partition Number (PN) valid, if set, and Logical Block Number (LBN) valid, if set. The Partition Number must be 0 on a non-partitioned volume, if the PN field is indicated as valid. On a partitioned volume, the Partition Number field is set to the partition number to be positioned to prior to further positioning. Partition numbers are assigned incrementally starting with 0 for the first partition on the volume. If the PN field is indicated as invalid, the current partition is assumed. The File Number and Physical Reference Index are ignored for this order. The Logical Block Number (LBN) uniquely identifies a logical block within the specified partition and the current (possibly residual) data domain. The associated position indicated is immediately prior to the specified logical block. Logical block numbers are assigned incrementally starting with 0 for the first logical block within the Partition. As the flowchart 850 of FIG. 8 illustrates, the ending position for LB is achieved with the following exemplary procedure: At step 802, a determination is made whether PN (n) is indicated as valid. If so, then the tape is positioned to BOP of the indicated partition, at step 804, and the LBN is validated, at step 812. If the PN cannot be found, which determination is made at step 802, then the command is presented unit check status indicating Execution Exception, Partition Not Found, at step 808. If the PN is indicated as invalid, which determination is made at step 802, then the tape remains at current position, at step 810, and the LBN is checked, at step 812. If LBN is indicated as valid, then, at step 816, a determination is made whether LBN n−1 is valid. If LBN n−1 is valid, then, at step 814, from the current position, the tape is repositioned immediately following logical block n−1 (assuming n was specified). LBN n−1 is validated at step 816. If n=0, which determination is made at step 816, the tape is positioned to BOP according to device dependent mechanisms, at step 818. If the LBN n−1 cannot be found, as determined at step 816, then the command is presented unit check status indicating Execution Exception, Block Not Found, at step 822. If neither PN nor LBN is valid, then the command is presented unit check status indicating Command Reject, Parameter Error, at step 820. If the specified Logical Block Number type does not match the block pointer format currently active for the device, then the command may be presented unit check status indicating Command Reject, Parameter in Conflict (step not shown). The command Locate Block order is subject to data checks or sequence checks depending on the settings specified in Device Control Page 3 for Position Absolute commands. Synchronization of any buffered write data will be attempted when this order is accepted. Any motion command which attempts to cross an End Of Data mark as a result of specifying a Logical Block Number not in the current domain for the current partition or in the non-residual domain if the target partition differs from the current partition, will terminate with a unit check indicating Boundary Exception, End Of Data encountered. A subsequent motion command which attempts to move beyond the End of Data mark will succeed, if the DCP3 control enabling residual data access is set (otherwise it will terminate with a unit check indicating Boundary Exception, End Of Data encountered). In this case, the medium is now positioned in a residual data domain. The first motion command will likely fail with a unit check indicating Data Check, Block Sequence error. This command is subject to the same unit checking rules as those for the Locate command except that an additional Execution Exception is added: Partition Not found, and an additional Command Reject is added: Parameter in Conflict (to cover the case where the specified Logical Block Number Type does not match the block pointer format currently active for the device). In a residual data domain, all commands continue to operate as specified, however, all positioning (LOC, FSF, BSF, FSB, BSB, POSREL 400, POSAB 700) will be performed at read speed only. The Position Pointer returned by the Position Sense command may be used as the final 24 bytes of the Position Absolute command 700 parameter data.

The Locate File (LF) order 702 of the Position Absolute command 700 requests the logical medium to be adjusted to the file indicated by the File Number and the Partition Number (if valid) Position Pointer specified in the parameter data. The command works in conjunction with the data reported by the Position Sense command. An exemplary LF order causes 28 bytes of data to be transferred from the channel to control unit, which may include Order Flags; Validity Flags; Identifier Flags; Partition Number (PN); and File Number (FN). The Order Flags may include bits to indicate synchronous/asynchronous operation of the command, as well as an indicator that program notification of completion will be provided when the command is executing as asynchronously. The Validity Flags may include Partition Number (PN) valid, if set, and File Number (FN) valid, if set. The Identifier Flags are ignored for this order. On a non-partitioned volume, if the PN field is indicated as valid, the Partition Number must be 0. On a partitioned volume, the PN field is set to the partition number to be positioned to prior to further positioning. Partition numbers are assigned incrementally starting with 0 for the first partition on the volume. If the PN field is indicated as invalid, the current partition is assumed. The File Number represents a file number within the specified partition and the current (possibly residual) data domain, where file numbers start from 0 at BOP and increment following each tape mark. Absolute file numbers may be non-unique across end-of-data mark (residual data) domains. For a labeled tape, each header label group defines a file, the user data defines a file, and the trailer label group defines a file. As the flowchart 850 of FIG. 8 illustrates, the ending position for LF is achieved with the following exemplary procedure: At step 832, a determination is made whether PN (n) is indicated as valid. If so, then the tape is positioned to BOP of the indicated partition, at step 834, and the FN is validated, at step 842. If the PN cannot be found, which determination is made at step 832, then the command is presented unit check status indicating Execution Exception, Partition Not Found, at step 838. If the PN is indicated as invalid, which determination is made at step 832, then the tape remains at current position, at step 840, and the FN is checked, at step 842. If FN is indicated as valid, then, at step 836, a determination is made whether FN n−1 is valid. If FN n−1 is valid, then, at step 844, from the current position, the tape is repositioned immediately following tape mark n−1 in the current partition (assuming n was specified). FN n−1 is validated at step 836. If n=0, which determination is made at step 836, the tape is positioned to BOP according to device dependent mechanisms, at step 848. If FN n−1 cannot be found, as determined at step 836, then the command is presented unit check status indicating Execution Exception, File Not Found, at step 852. If neither PN nor FN is valid, then the command is presented unit check status indicating Command Reject, Parameter Error, at step 851. The order is subject to data checks or sequence checks depending on the settings specified in Device Control Page 3 for Position Absolute commands. Synchronization of any buffered write data will be attempted when this order is accepted. Any motion command which attempts to cross an End Of Data mark as a result of specifying a File Number not in the current domain for the current partition or in the non-residual domain if the target partition differs from the current partition, will terminate with a unit check indicating Boundary Exception, End Of Data encountered. A subsequent motion command which attempts to move beyond the End Of Data mark will succeed, if the DCP3 control enabling residual data access is set (otherwise it will terminate with a unit check indicating Boundary Exception, End-of-Data encountered). In this case, the medium is now positioned in a residual data domain. The first motion command will likely fail with a unit check indicating Data Check, Block Sequence error. This command is subject to the same unit checking rules as those for the Locate command except that two additional Execution Exceptions are added: Partition Not found and File Not Found. In a residual data domain, all commands continue to operate as specified, however, all positioning (LOC, FSF, BSF, FSB, BSB, POSREL 400, POSAB 700) will be performed at read speed only. The Position Pointer returned by the Position Sense command may be used as the final 24 bytes of the Position Absolute command 700 parameter data.

The Locate Physical Reference Index (LPRI) order 703 of the Position Absolute command 700 requests the logical medium to be adjusted to the physical position indicated by the physical reference index specified in the parameter data. The command works in conjunction with the data reported by the Position Sense command. An exemplary LPRI order causes 28 bytes of data to be transferred from the channel to control unit. Such data may include Order Flags; Validity Flags; Identifier Flags; and a Physical Reference Index (PRI). The Order Flags may include bits to indicate synchronous/asynchronous operation of the command, as well as an indicator that program notification of completion will be provided when the command is executing as asynchronously. The Validity Flags may include bits to indicate, e.g. Physical Reference Index (PRI) valid, if set. The Identifier Flags may include Physical Reference Index Type, Tach Regions (Least Significant Bit)+Wrap Counter (next Most Significant Bit), and/or Segment & Wrap Identifier. The Physical Reference Index (PRI) defines a physical area on a tape volume that can be used as a starting point for subsequent searches by block or File Number. As the flowchart 850 of FIG. 8 illustrates, the ending position for LPRI is achieved with the following exemplary procedure: At step 860, a determination is made whether the PRI is indicated as valid. If so, then the tape is positioned to a point nominally at the indicated PRI, at step 861. If the PRI cannot be found, which determination is made at step 860, then the command is presented unit check status indicating Execution Exception, Physical Reference Index Not Found, at step 862. If the PRI is indicated as invalid, which determination is made at step 860, then the command is presented unit check status indicating Command Reject, Parameter Error, at step 863. This is never supported when device virtualization is active. The Locate Physical Reference Index order is subject to data checks or sequence checks depending on the settings specified in Device Control Page 3 for Position Absolute commands. Synchronization of any buffered write data will be attempted when this order is accepted. Locate Physical Reference Index will terminate with a unit check indicating Protection Exception, Mode Protect, if the DCP3 control enabling residual data access is not set—regardless of whether the PRI is in the first (or non-residual) data domain or not. It is also subject to unit checking for Execution Exception, Physical Reference Index Not Found. Otherwise it follows the same unit checking rules as those for the Locate command. In a residual data domain, all commands continue to operate as specified, however, all positioning (LOC, FSF, BSF, FSB, BSB, POSREL 400, POSAB 700) will be performed at read speed only. The position pointer returned by the Position Sense command may be used as the final 24 bytes of the Position Absolute command 700 parameter data.

Position Sense

The present invention comprises a new Position Sense (POSNS) command, which retrieves the current logical medium position including Partition Number (PN), Channel Logical Block Number (CLBN), File Number (FN), and Physical Reference Index (PRI) associated with the Channel Logical Block Number on the physical medium. An exemplary POSNS command causes 28 bytes of data to be transferred from the control unit to the channel. Such data may include a Position Pointer that comprises all fields that are defined and known at the time the command is issued. When the block pointer is undefined, as when there is no associated medium, the block pointers returned are consistent with the block pointers associated with Beginning of Volume (BOV).

The channel logical block number does not necessarily match the device logical block number. If a comparison of the SCSI Read Position Last Block Location does not match the current Channel Logical Block Number, then validity flag synchronization indicators of the Position Pointer are set to zero. If the block numbers match, then validity flag synchronization indicators are set to one.

If it is necessary to have the Position Pointer fields synchronized between the channel and tape position, then the host may perform some form of tape position synchronization. If the device is in write mode then this could be accomplished via a SYNC command. If the device is in read mode then this could be accomplished via a REW command followed by a LOC command back to the current channel position. It is noted that, since the control unit performs read ahead of the data from the device, issuing just a LOC command from the host without issuing the REW command may result in only repositioning within the control unit and not within the drive. By also issuing the REW command the host is therefore guaranteed that the drive will actually be repositioned to the current channel position. It is further noted that, due to the drive's internal implementation of data blocking within physical blocks, it may not be possible to guarantee that the Locate Physical Reference Index (LPRI) position will be synchronized with the Logical Block Number (LBN) or File Number (FN) fields.

The File Number (FN) returned by the POSNS command when in either read mode or in write mode is always the File Number associated with the beginning of the current file. For read mode, this is true independent of the current read direction (either read forward or read backward/previous).

Applicants' invention includes a data storage and retrieval system comprising a computer useable medium having computer readable program code disposed therein for implementing Applicants' method to record information in alternative information storage architectures using a data storage device having a fixed device architecture. Applicants' invention further includes a data storage and retrieval system comprising a computer useable medium having computer readable program code disposed therein for implementing Applicants' method to increase the positioning speed of data storage media. The programming of the present invention may comprise a computer program product embodied as program code stored in a storage device, such as a magnetic disk drive or memory, etc., in a computer, or may comprise an article of manufacture, such as a CD ROM, magnetic tape, etc.

The control logic described herein may be implemented in an HSM program maintained in a host system, which generates commands to cause the tape subsystem to perform the desired input/output operations with respect to tape cartridges (or other data storage media). Those skilled in the art will recognize that some portions of the logic could be implemented in locations other than the host system, such as within the tape subsystem. Moreover, the operations and components described herein with respect to the host system, tape subsystem, and HSM program may be implemented in a single computer machine or distributed across a plurality of computer machines.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage system, comprising:
at least data storage device comprising an information storage medium removeably disposed therein, said information storage medium comprising a sequential architecture file system comprising a plurality of files;
wherein said data storage device is capable of receiving a relative file positioning command and positioning said information storage medium, relative to the current position, based upon file marks, sequential file marks, or end of data marks, to the corresponding said file of said information storage medium; and
wherein said data storage device is capable of receiving an absolute file positioning command and positioning said information storage medium, independent of the current position, to a given file mark, sequential file mark, or end of data mark, to the corresponding said file of said information storage medium.

2. A data storage system as claimed in claim 1, said data storage device further comprising a memory device and device microcode disposed in said memory device, wherein said device microcode comprises instructions to execute said relative file positioning command and to execute said absolute file positioning command.

3. A data storage system as claimed in claim 2, wherein said memory device comprises non-volatile memory.

4. A data storage system as claimed in claim 2, wherein said instructions comprise no commands to execute multi-file space operations.

5. A data storage system as claimed in claim 1, wherein said data storage device comprises no software to execute multi-file space operations.

6. A method of operating a data storage system, comprising the steps of:
providing a data storage system which includes a data storage device comprising an information storage medium removeably disposed therein, wherein said information storage medium comprises at least one file, and wherein said data storage device comprises no software to execute multi-file space operations;

providing to said data storage device a relative file positioning command;

positioning said information storage medium relative to the current position, based upon file marks, sequential file marks, or end of data marks, to access said file.

7. The method of claim 6, further comprising the steps of:

providing to said data storage device an absolute file positioning command;

positioning said information storage medium, independent of the current position, to a given file mark, sequential file mark, or end of data mark, to access said file.

8. The method of claim 6, wherein said data storage system comprises an Enterprise System Connection.

9. The method of claim 6, wherein said data storage system comprises a native Fibre Channel system.

* * * * *